Patented July 1, 1952

2,602,041

UNITED STATES PATENT OFFICE 2,602,041

METHOD FOR THE MANUFACTURE OF POLYMYXIN

Annie Maude Brown, London, England, assignor to Burroughs Wellcome & Co. (U. S. A.) Inc., Tuckahoe, N. Y., a corporation of New York No Drawing. Application March 12, 1948, Serial No. 14,631. In Great Britain April 21, 1947

7 Claims. (Cl. 167—65)

This invention relates to an improved process for method for the manufacture of polymyxin, namely the antibiotic formed by the metabolism of *Bacillus aerosporus* Greer or *Bacillus polymyxa* (Prazmowski) Migula. A method of producing this antibiotic was described in the specification accompanying application for Letters Patent No. 779,229 dated October 10, 1947. The present invention relates to an improvement in the aforesaid process and the object of it is make possible the production of a purer product and to simplify the extraction process.

After the bacillus has been grown upon the culture medium it is necessary to remove the organisms from the metabolism fluid before the latter can be treated to extract the antibiotic therefrom; the remaining liquid is then treated with activated charcoal under acid conditions to remove part of the impurities present and the charcoal filtered off, the filtrate being then further treated as described in the specification of the prior application above mentioned. It is found sometimes, however, that the metabolism fluid contains considerable quantities of impurities of a gummy nature and when this happens it is a matter of considerable difficulty to filter off the supernatant liquid after the treatment with charcoal above mentioned. It is the object of the present invention to overcome this difficulty.

By research and experiment it has been found that the gummy impurity is destroyed by heat under acid conditions without serious loss of the antibiotic. The gum is apparently hydrolysed to soluble compounds thus facilitating filtration.

My invention accordingly comprises a modification in the process of extracting the antibiotic above referred to consisting in heating the metabolism fluid under acid conditions before treating it with charcoal, the time and temperature of heating and the acidity being such that substantially all (at least 90%) of the gummy impurity is converted into a non-gummy form while leaving substantially all (at least 90%) of the antibiotic activity unimpaired.

Stated in more detail my invention comprises a process for the preparation of an antibiotic comprising forming a culture of the bacillus known as *Bacillus aerosporus* Greer or *Bacillus polymyxa* (Prazmowski) Migula in a nutrient fluid, removing the bacillus from the metabolism fluid wherein it has grown, heating the said fluid under acid conditions, filtering it, treating it with activated charcoal to extract impurities therefrom, increaasing the pH of the fluid above 6.0, adsorbing the antibiotic upon activated charcoal and removing the antibiotic from the said activated charcoal under acid conditions by treating the latter with a solvent for said antibiotic.

The variable factors above mentioned are interdependent, and also dependent upon the particular acid present and to some extent upon the culture medium employed. The stronger the acid present, the more quickly the gummy impurity is attacked and therefore the shorter is the time of heating required or the lower the temperature of heating needed. Excessive heating is to be avoided, as tending to destroy the antibiotic activity.

The particular time and temperature of heating to be employed for any given metabolism solution and acid is a matter of simple test and observation.

By way of illustration only the following more detailed description of a method of preparing an antibiotic in accordance with my invention will now be given.

The organism which I employ is a bacillus having central spores; it is motile and produces acid and gas with glucose, lactose, saccharose, mannite, maltose, xylose, arabinose, salicin, raffinose, laevulose and inulin but not with sorbitol or inosite; is indole and methyl-red negative and gives a positive Voges-Proskauer reaction. It produces acid and clot from litmus milk; the litmus is reduced, whey separates and the clot digests. Nitrates are reduced, gelatin undergoes late saccate liquification, coagulated serum is liquified. There are at least two colonial variants, one being of whitish appearance and the other brown or grey. Colonies of two of the variants are smooth in outline and mucoid.

The bacillus in question is widely distributed in nature. Besides being airborne it has been found in water, soil, milk, faeces and decaying vegetables.

I select strains of the bacillus which during metabolism yield good amounts of the desired antibiotic. This may be done by biological assay of cultures derived from separate colonies of the organism obtained by plate culture.

I find that strains of the bacillus which form mucoid, white and shiny colonies in general produce the best yields of the antibiotic and I select these strains, avoiding those strains which produce colonies which are rough and brown.

The bacillus grows well on the usual culture media. I have obtained best results with an aqueous medium containing 10% by volume of nutrient broth with the addition of 0.002% manganese sulphate, 3% glucose and 0.6% di-ammonium hydrogen phosphate, having a pH of approximately 7.4. The bacillus being aerobic, culture (as in the case of other aerobic bacilli) may be either in static shallow layers or in deeper vessels with artificial aeration.

To prepare the inoculum, incubation of the selected strain at 37° C. for 18 to 24 hours is a suitable procedure. About 5 millilitres of the inoculum may then be added to 100 millilitres of the above described nutrient medium in a flat flask and the whole incubated at 22–28° C. for 3 to 8 days or for 20–24 hours in cases where artificial aeration is employed. Samples are tested for antibiotic content periodically and the culture batch harvested when the antibiotic content is substantially at a maximum.

Because the antibiotic is absorbed by filter materials, the metabolism fluid should be separated from the bacteria by centrifugation. 0.4% of chloroform may be added as preservative.

The heat treatment of the metabolism fluid in the presence of acid, above specified, is then carried out.

As an example of suitable conditions, it may be stated that addition of 2% by weight of concentrated hydrochloric acid (of a strength of 40 grams hydrochloric acid gas in each 100 millilitres) to one metabolism solution apparently completely hydrolysed all gummy impurities present after heating to 80° C. for 30 minutes, without appreciable loss of antibiotic activity of the fluid.

Hydrochloric and sulphuric acids are the acids of choice, but any other acid which does not react with and destroy the activity of the antibiotic (a matter of simple test) may be employed, although the time or temperature of the heat treatment (or both) will almost certainly be found to be greater than when hydrochloric or sulphuric acids are employed.

If heating is prolonged sufficiently any pH of less than 6.0 may be employed. Destruction of the antibiotic activity, however, is diminished by lowering the pH during the heat treatment step, preferably to about 2.5, that is to say 2.0 to 3.0.

In some cases, the metabolism fluid initially has a pH below 6.0. In such cases it is possible to carry out the heat treatment step without any further addition of acid, though usually such addition is desirable in order to reduce the time involved, or the temperature employed, or to reduce destruction of the antibiotic.

I then treat this acidified fluid with a suitable activated charcoal, whereby I adsorb much of the colouring matter and other impurities present but not the antibiotic. About 0.5% of charcoal relatively to the weight of the solution is a suitable amount. Whether a charcoal is or is not a suitable one, that is to say whether it will adsorb the colouring matter and impurities but not the antibiotic under acid conditions is a matter of simple test. The activated charcoals sold under the trade names Farnell's No. 14 and Farnell's L. S. are suitable for use in this manner. The charcoal is then filtered off and discarded.

The filtrate, containing the antibiotic, is then made neutral (pH 6.0 to 8.0) by addition of alkali, such as caustic soda. It is then treated again with a suitable activated charcoal. This time (under neutral conditions) the antibiotic is adsorbed.

The charcoal is filtered off and then the antibiotic is eluted from it by washing with aqueous acetone, of approximately 40% concentration by weight, maintained at a pH of approximately 2.5 with sulphuric acid.

Acetone is then added to the eluate until the concentration of acetone is approximately 75%. This solution is then chilled to about 4° C. for about 16 hours. The solid matter, containing the antibiotic, is removed by filtration. It is then treated with water at about 30° C. The insoluble residue is filtered off and discarded.

The filtrate is brought to pH 7 by adding alkali. Further gelatinous inactive material deposits and is filtered off. The remaining solution is then frozen and dried under vacuum while frozen, yielding the crude sulphate of the desired antibiotic.

The antibiotic may be purified by conversion to its helianthate, by adding a saturated solution of methyl orange to a solution of a salt of the antibiotic in aqueous methanol. The helianthate separates after standing at 4° C. for 12 hours.

If the quantity of methyl orange added is such that about 80% of the antibiotic activity is associated with the precipitate, the latter contains the antibiotic in purified form, certain of the impurities remaining in the mother liquor in these circumstances. The precipitates may be washed successively with water and methanol and then treated with acid in methanol to convert the antibiotic to its soluble hydrochloride or other desired acid salt, which salt may be recovered in solid form, for example by precipitation with acetone.

The new antibiotic is a fairly strong base. Its hydrochloride is extremely soluble in water and less easy to handle than its less soluble sulphate. Its helianthate is still less soluble. The base is an off-white amorphous solid. It is stable for short periods in aqueous solution at a pH of 3 to 8. It is very unstable in alkaline solutions. It cannot be extracted from aqueous solution by chloroform. It is most conveniently dissolved in water or methanol.

The antibiotic is a polypeptide having a molecular weight of at least 2,000, consisting essentially of three amino acids, threonine, leucine and $\alpha$-$\gamma$-diaminobutyric acid, in the relative proportions 4:1:15, approximately. Attention may be directed to the fact that the antibiotic produced by my process, unlike certain other antibiotics, does not yield serine when it is hydrolysed.

The antibiotic has been proved by in vivo experiments with mice to have chemotherapeutic activity and give a useful degree of protection against the following pathogenic organisms: *Haemophilus pertussis*, *Haemophilus influenzae*, *Eberthella typhi*, *Escherichia coli* (including the haemolytic varieties thereof associated with the disease of white scour in calves) and *Brucella bronchiseptica*. It has been found to have in vitro anti-bacterial activity against all the organisms mentioned above and also against all species of Salmonella, *Pseudomonas aeruginosa*, *Shigella dysenteriae*, *Shigella para-dysenteriae* and *Shigella sonnei*.

It appears to be bactericidal and not merely bacteriostatic towards organisms sensitive to its activity.

It has been found experimentally that the administration of the antibiotic in doses of 0.05 milligram by injection twice daily for three days into 15 mice each infected intra-cerebrally with 10,000 lethal doses of mouse-passaged *Haemophilus pertussis* enabled 13 of them to survive the infection for at least 15 days. 14 similarly infected mice which were not given the antibiotic all died, the average survival period being 4.7 days.

The antibiotic has a relatively low toxicity, but when very much larger doses of it are administered intravenously to mice death occurs from respiratory failure, while somewhat less than a lethal dose results in clonic convulsions followed by paralysis similar to that which may be induced by administration of curare, associated with marked respiratory difficulty and cyanosis, but the animals recover within 10 minutes. The indications and limitations on the use of polymyxin antibiotics are set forth in the article by B. M. Kagan, M. D., et al. in the J. Lab. and Clin. Med., volume 37, page 402 (March 1951).

What I claim is:

1. In the process of recovering an antibiotic from the metabolism fluid of a bacillus selected from the class consisting of Bacillus aerosporus Greer and Bacillus polymyxa (Prazmowski) Migula, the step of rendering impurities of a gummy nature soluble by heating the said metabolism fluid at a pH of below 6.0 and at an elevated temperature until such impurities have dissolved.

2. A process for the preparation of an antibiotic comprising forming a culture of a bacillus selected from the class consisting of Bacillus aerosporus Greer and Bacillus polymyxa (Prazmowski) Migula in a nutrient fluid, removing the bacillus from the metabolism fluid wherein it has grown, heating the said fluid under acid conditions at a pH of below 6.0 and at an elevated temperature, filtering it, treating it with activated charcoal to extract impurities therefrom, increasing the pH of the fluid above 6.0, adsorbing the antibiotic upon activated charcoal and removing the antibiotic from the said activated charcoal under acid conditions by treating the latter with a solvent for said antibiotic.

3. The process claimed in claim 1 in which the metabolism fluid is heated with hydrochloric acid.

4. The process claimed in claim 1 in which the metabolism fluid is heated with hydrochloric acid, the hydrochloric acid present forming approximately 2% of the weight of the mixture and being initially of a strength of approximately 40% by weight.

5. The process claimed in claim 1 in which the metabolism fluid is heated with sulphuric acid.

6. The process claimed in claim 1 in which the metabolism fluid during the heating step has a pH of 2.0 to 3.0.

7. The process claimed in claim 1 in which the metabolism fluid is heated at approximately 80° centigrade for about 30 minutes.

ANNIE MAUDE BROWN.

REFERENCES CITED

The following references are of record in the file of this patent:

FOREIGN PATENTS

| Number | Country | Date |
| --- | --- | --- |
| 315,263 | Great Britain | Aug. 28, 1930 |

OTHER REFERENCES

Tilden et al., J. Bact., vol. 43, pp. 527–544, 1942.

Bergey's Manual of Determinative Bacteriology, 5th ed., Williams and Wilkins Co., Balt., 1939, pp. 701–703.

Long, on Experimental Use of Polymyxin, Chloromycetin and Aureomycin in California Medicine, March 1949, vol. 70, pp. 157–166.

Stanley et al., Bull. Johns Hopkins Hospital, vol. 81, pp. 43–54, July 1947.